US012585253B2

(12) United States Patent
Karakama

(10) Patent No.: US 12,585,253 B2
(45) Date of Patent: Mar. 24, 2026

(54) ASSISTANCE DEVICE AND MECHANICAL SYSTEM

(71) Applicant: Fanuc Corporation, Yamanashi (JP)

(72) Inventor: Tatsuo Karakama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 398 days.

(21) Appl. No.: 18/036,238

(22) PCT Filed: Nov. 19, 2021

(86) PCT No.: PCT/JP2021/042683

§ 371 (c)(1),
(2) Date: May 10, 2023

(87) PCT Pub. No.: WO2022/113911

PCT Pub. Date: Jun. 2, 2022

(65) Prior Publication Data

US 2023/0315061 A1      Oct. 5, 2023

(30) Foreign Application Priority Data

Nov. 25, 2020    (JP) ................................. 2020-195063

(51) Int. Cl.
*G05B 19/418*          (2006.01)
(52) U.S. Cl.
CPC ..... *G05B 19/4184* (2013.01); *G05B 19/4183* (2013.01)
(58) Field of Classification Search
USPC ....................................................... 700/108
See application file for complete search history.

(56) References Cited

U.S. PATENT DOCUMENTS

| | | | |
|---|---|---|---|
| 2007/0061232 A1* | 3/2007 | Bonissone | ............. G06Q 40/06 705/36 R |
| 2017/0111235 A1* | 4/2017 | Ishikura | .............. H04L 43/0817 |

(Continued)

FOREIGN PATENT DOCUMENTS

| | | |
|---|---|---|
| JP | H06-176030 A | 6/1994 |
| JP | 2000092240 A | 3/2000 |

(Continued)

OTHER PUBLICATIONS

International Search Report and Written Opinion for International Application No. PCT/JP2021/042683, dated Feb. 1, 2022, 6 pages.

*Primary Examiner* — Hien D Khuu
(74) *Attorney, Agent, or Firm* — BUCHANAN INGERSOLL & ROONEY PC

(57)          ABSTRACT

An assistance device configured to assist operations with respect to a plurality of machines is provided with: an information storage unit for storing machine information including at least one of maintenance history information, abnormality history information, and predicted service life information for each of the plurality of machines, in association with identification information of the machine; a criteria accepting unit for accepting search criteria for specifying desired machine information; and an information retrieval unit for comparing the search criteria accepted by the criteria accepting unit with the machine information stored in the information storage unit, and extracting the identification information of the machine corresponding to the machine information matching the search criteria.

7 Claims, 10 Drawing Sheets

(56)         References Cited

U.S. PATENT DOCUMENTS

2017/0123397 A1 *   5/2017   Billi .................... G05B 19/048
2017/0300027 A1 *  10/2017   Oyama .................. G07C 3/00
2018/0010986 A1 *   1/2018   Matsuo ............... G06Q 30/016
2018/0173181 A1 *   6/2018   Yanagita ........... G05B 19/0405
2018/0181097 A1 *   6/2018   Yanagita ........... G05B 19/0426
2019/0310620 A1 *  10/2019   Kamiguti ........... G06F 11/0766

FOREIGN PATENT DOCUMENTS

JP         2004164025  A  *   6/2004
JP         2010-026725 A        2/2010
JP         2010272068  A       12/2010
JP         2010287003  A  *  12/2010
JP         2011192201  A  *   9/2011
JP         2012014294  A        1/2012
JP         2014164598  A        9/2014
JP         2016122319  A        7/2016
JP            6425295  B1 *  11/2018
JP         2019185292  A       10/2019
JP         2020016998  A        1/2020
KR        20060057131  A        5/2006

* cited by examiner

START

ACCEPT SEARCH CONDITION   S101

CHECK SEARCH CONDITION AGAINST MACHINE INFORMATION   S102

EXTRACT DESIRED IDENTIFICATION INFORMATION   S103

DISPLAY IDENTIFICATION INFORMATION   S104

END

START

ACCEPT SEARCH CONDITION   S101

CHECK SEARCH CONDITION AGAINST MACHINE INFORMATION   S102

EXTRACT DESIRED IDENTIFICATION INFORMATION   S103

GENERATE MAP   S105

DISPLAY MAP   S106

END

FIG. 4

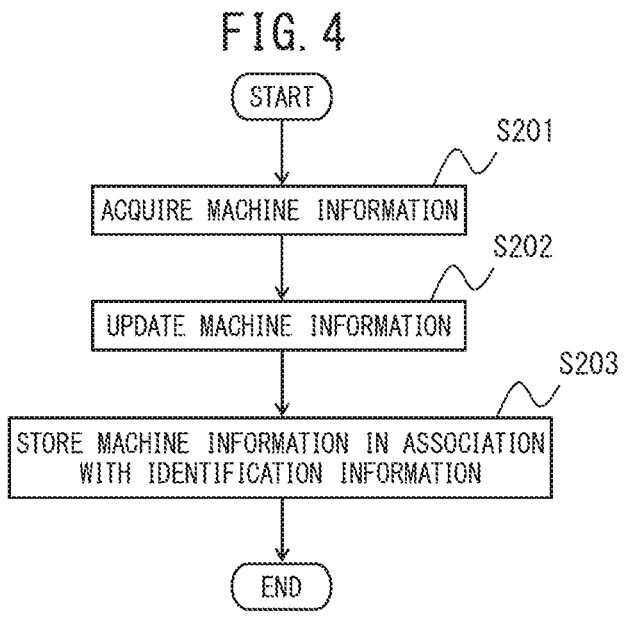

START

ACQUIRE MACHINE INFORMATION  S201

UPDATE MACHINE INFORMATION  S202

STORE MACHINE INFORMATION IN ASSOCIATION WITH IDENTIFICATION INFORMATION  S203

END

FIG. 5A

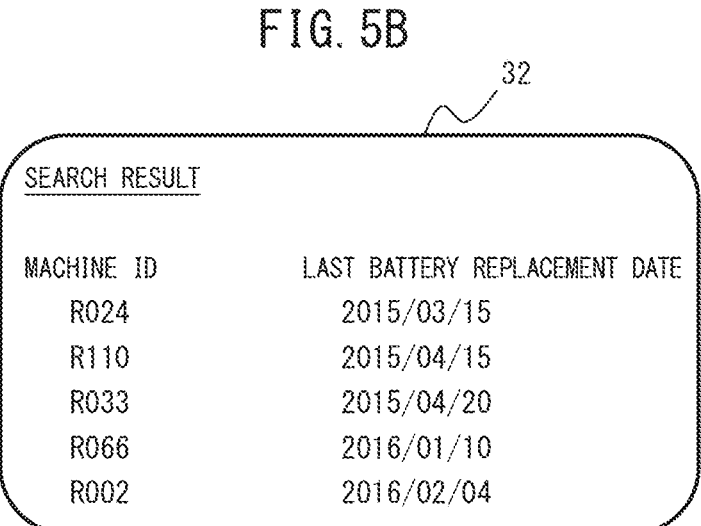

SEARCH CONDITION

[OPERATION STATUS: PRODUCTION OUT OF SERVICE] (AND)
[MODEL: ROBOT-100] (AND)
[LAST BATTERY REPLACEMENT TIME
 : 2016/2/28 OR EARLIER] (AND)
[MAXIMUM NUMBER OF OUTPUT ITEMS: 5]

SEARCH RESULT

| MACHINE ID | LAST BATTERY REPLACEMENT DATE |
| --- | --- |
| R024 | 2015/03/15 |
| R110 | 2015/04/15 |
| R033 | 2015/04/20 |
| R066 | 2016/01/10 |
| R002 | 2016/02/04 |

SEARCH CONDITION

[OPERATION STATUS: PRODUCTION OUT OF SERVICE]  (AND)
[MODEL: ROBOT-300]  (AND)
[PREDICTED LIFESPAN OF SECOND SHAFT REDUCTION GEAR
: 2022/6/30 OR EARLIER]  (AND)
[MAXIMUM NUMBER OF OUTPUT ITEMS: 4]

SEARCH RESULT

| MACHINE ID | PREDICTED END OF LIFE DATE |
|------------|----------------------------|
| R054       | 2021/12/01                 |
| R020       | 2022/01/15                 |
| R051       | 2022/02/20                 |
| R003       | 2022/02/28                 |

31

SEARCH CONDITION

[OPERATION STATUS: PRODUCTION OUT OF SERVICE]  (AND)
[TEMPORARY STOP FREQUENCY: 3 (TIMES/MONTH) OR MORE]

32

SEARCH RESULT

| MACHINE ID | TEMPORARY STOP FREQUENCY (TIMES/MONTH) |
|---|---|
| R044 | 5 |
| R032 | 4 |
| R008 | 4 |
| R078 | 3 |

31

```
SEARCH CONDITION
─────────────────

[OPERATION STATUS: PRODUCTION OUT OF SERVICE]  (AND)
[MODEL: ROBOT-100]  (AND)

[LAST BATTERY REPLACEMENT TIME
: 2016/2/28 OR EARLIER]  (AND)

[MAXIMUM NUMBER OF OUTPUT ITEMS: 5]
```

32

ASSISTANCE DEVICE AND MECHANICAL SYSTEM

CROSS REFERENCE TO RELATED APPLICATIONS

This is the U.S. National Phase application of PCT/JP2021/042683, filed Nov. 19, 2021, which claims priority to Japanese Patent Application No. 2020-195063, filed Nov. 25, 2020, the disclosures of these applications being incorporated herein by reference in their entireties for all purposes.

FIELD OF THE INVENTION

The present invention relates to an assistance device and a mechanical system.

BACKGROUND OF THE INVENTION

In a factory where many production machines (hereinafter simply referred to as "machines") such as robots, machine tools, laser machines, wire electric discharge machines, or injection molding machines are used, an operator performing operations such as maintenance or inspection on the machines generally predetermines a machine being an operation target by investigating various types of information such as maintenance histories of the machines in the factory, an abnormality history, or predicted lifespans of parts used in the machines and subsequently locates the installation location of the determined machine on site.

Further, in recent years, a communication network connecting many installed machines is constructed in a factory, and enhanced efficiency in management of the machines and management of a manufacturing line including many machines are pursued.

For example, a management system including: a plurality of information output units respectively included in a plurality of devices, each unit being configured to output operating condition information indicating an operating condition of a related device; a registration means for registering operating condition information output by the plurality of information output units; an operator terminal carried by an operator; a device position information providing means for providing the operator terminal with device position information indicating the position of the device related to operating condition information when the operating condition information is registered in the registration means; a terminal position calculation means for calculating terminal position information indicating the position of the operator terminal; and a display means included in the operator terminal for displaying, on a map, a device position represented by device position information provided by the device position information providing means and an operator terminal position represented by terminal position information calculated by the terminal position calculation means is known (for example, see PTL 1).

For example, a management device for centrally managing machine information including at least specification information and maintenance information of every industrial machine installed in a factory, the management device including a storage unit and a control unit, wherein the storage unit stores positional information of every industrial machine installed in a factory and machine information of every industrial machine, the specification information includes at least hardware specification, software specification, network specification, and version information that are related to the industrial machine, and the control unit includes a factory layout providing unit configured to output factory layout information for displaying a placement state of the industrial machine in the factory, based on positional information of the industrial machine stored in the storage unit and a machine information providing unit configured to acquire machine information of the industrial machine selected through the output factory layout information from the storage unit and output acquired machine information in association with the selected industrial machine is known (for example, see PTL 2).

For example, a factory monitoring system including a data acquisition unit configured to acquire data including time information and being related to at least one machine and a storage management unit configured to store data related to each machine acquired by the data acquisition unit into a storage unit along with identification information of each machine, and a diagnostic service system predicting a possibility of occurrence of abnormality of the machine, based on past history data related to the machine and current data related to the machine, and providing preventive maintenance information related to the machine are known (for example, see PTL 3).

For example, a process monitoring device for monitoring a process on a production line in a factory, the process monitoring device including an image capture means for capturing an image of an operating condition of the process; a memory for storing video data captured by the image capture means; an external input means for inputting a signal from a detection device installed on the production line as a trigger signal; and a save processing means for, when the trigger signal is input, saving, as non-overwritable video data, video data going back a set time or more in the past from a time point of input of the trigger signal in video data recorded in the memory is known (for example, see PTL 4).

PATENT LITERATURE

[PTL 1] JP 2014-164598A
[PTL 2] JP 2020-016998A
[PTL 3] JP 2019-185292A
[PTL 4] JP 2016-122319A

SUMMARY OF THE INVENTION

In a factory where many machines exist, a series of operations of predetermining a machine being a target of maintenance or inspection and subsequently locating the installation location of the machine on site is a heavy burden. In recent years in particular, robotization of manual operations in a factory, downsizing and diversification of machines, and the like have advanced, and the number and the installation density of machines installed in a factory have increasing tendencies. Further, aging of operators performing operations on machines in a factory has also advanced. Based on such a situation, the operational burden is expected to further increase in the future. Accordingly, development of a technology for lightening an operational burden with respect to a plurality of machines installed in a factory has been desired.

According to an aspect of the present disclosure, an assistance device configured to assist an operation on a plurality of machines includes: an information storage unit configured to store machine information including at least one type of information out of maintenance history information, abnormality history information, and predicted lifespan information for each of the plurality of machines in association with identification information of the machine; a condition acceptance unit configured to accept a search condition for specifying desired machine information; and an information search unit configured to check the search condition accepted by the condition acceptance unit against the machine information stored in the information storage unit and extract identification information of a machine related to machine information satisfying the search condition.

Further, according to an aspect of the present disclosure, a machine system includes a plurality of machines and the aforementioned assistance device, wherein the assistance device includes an information acquisition unit configured to acquire the machine information.

Further, according to an aspect of the present disclosure, a machine system includes a plurality of machines and the aforementioned assistance device, wherein each of the plurality of machines includes an information acquisition unit configured to acquire the machine information.

According to the aspect of the present disclosure, an operational burden with respect to a plurality of machines installed in a factory is lightened.

BRIEF DESCRIPTION OF DRAWINGS

FIG. 4 is a flowchart illustrating a series of processing operations from acquisition to storage of machine information in the assistance device 1 according to the embodiment of the present disclosure.

FIG. 5A is a diagram illustrating a first example of a search condition and a search result displayed on a display unit in the assistance device according to the embodiment of the present disclosure and illustrates a search condition.

FIG. 5B is a diagram illustrating the first example of a search condition and a search result displayed on the display unit in the assistance device according to the embodiment of the present disclosure and illustrates a search result.

FIG. 6A is a diagram illustrating a second example of a search condition and a search result displayed on the display unit in the assistance device according to the embodiment of the present disclosure and illustrates a search condition.

FIG. 6B is a diagram illustrating the second example of a search condition and a search result displayed on the display unit in the assistance device according to the embodiment of the present disclosure and illustrates a search result.

DETAILED DESCRIPTION OF EMBODIMENTS OF THE INVENTION

An assistance device and a machine system will be described below with reference to drawings. In order to facilitate understanding, the drawings use different scales as appropriate. A configuration illustrated in a drawing is an example for implementation and the device and the system are not limited to the illustrated configuration.

Figure 1:
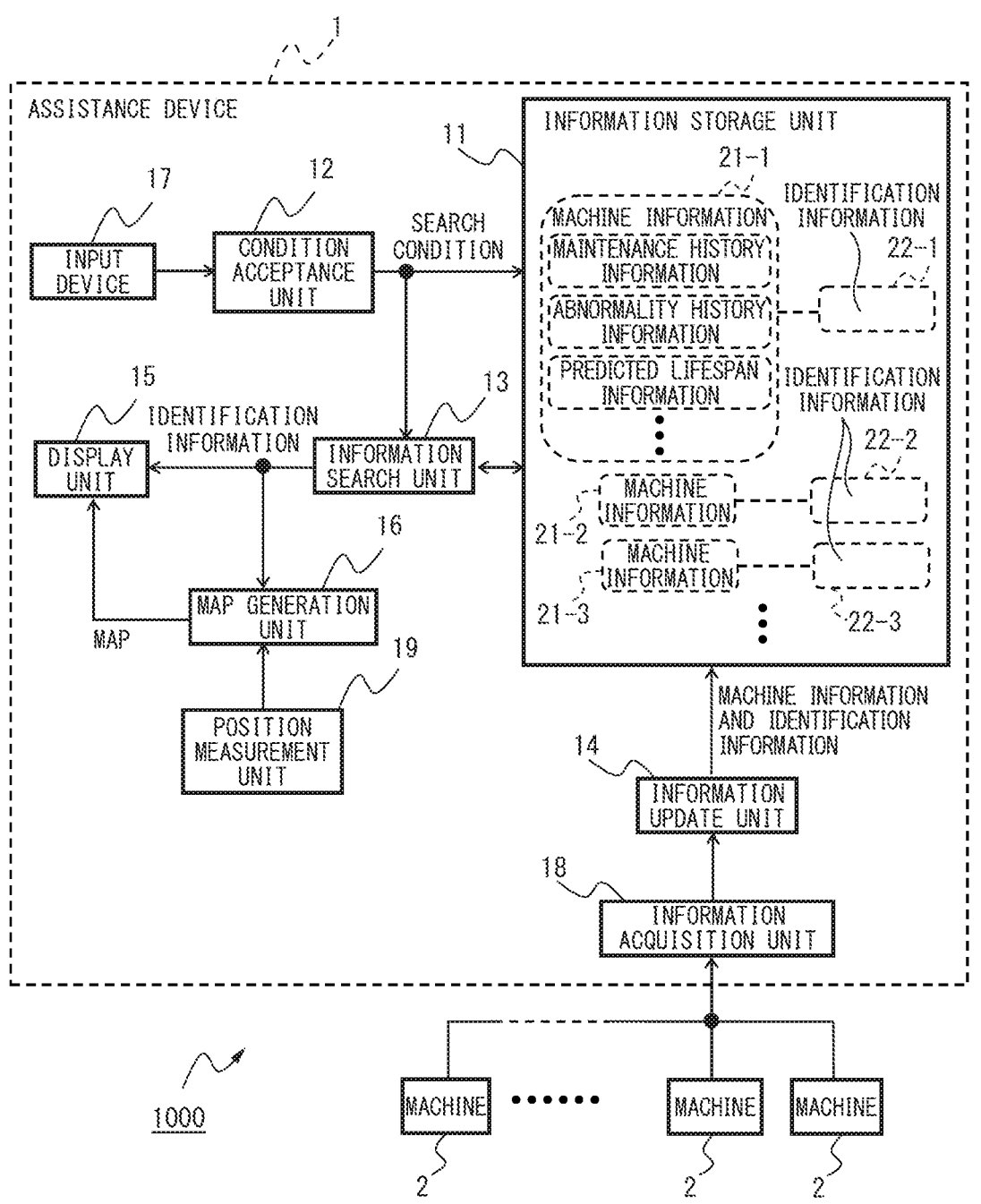
FIG. 1 is a block diagram of an assistance device and a machine system, according to an embodiment of the present disclosure.

FIG. 1 is a block diagram of an assistance device and a machine system, according to an embodiment of the present disclosure.

A machine system 1000 is configured with an assistance device 1 and a plurality of machines 2, according to the embodiment of the present disclosure.

A plurality of machines 2 are installed in a factory. Examples of the machine 2 include various types of production machines such as a robot, a machine tool, a laser machine, a wire electric discharge machine, and an injection molding machine.

The assistance device 1 assists operations on a plurality of machines 2 by an operator. The assistance device 1 includes an information storage unit 11, a condition acceptance unit 12, an information search unit 13, an information update unit 14, a display unit 15, a map generation unit 16, an input device 17, and an information acquisition unit 18.

An arithmetic processing unit (processor) is provided in the assistance device 1. The arithmetic processing unit includes the condition acceptance unit 12, the information search unit 13, the information update unit 14, the map generation unit 16, and the information acquisition unit 18. For example, each unit included in the arithmetic processing unit is a functional module provided by a computer program executed on the processor. For example, when the condition acceptance unit 12, the information search unit 13, the information update unit 14, the map generation unit 16, and the information acquisition unit 18 are constructed in a computer program format, a function of each unit can be provided by causing the arithmetic processing unit to operate in accordance with the computer program. The computer program for executing each type of processing in the condition acceptance unit 12, the information search unit 13, the information update unit 14, the map generation unit 16, and the information acquisition unit 18 may be provided in a form of being recorded on a computer-readable recording medium such as a semiconductor memory, a magnetic recording medium, or an optical recording medium. Alternatively, each of the condition acceptance unit 12, the information search unit 13, the information update unit 14, the map generation unit 16, and the information acquisition unit 18 may be provided as a semiconductor integrated circuit on which the computer program for providing the function of each unit is written.

For example, the information storage unit 11 may be configured with an electrically erasable-recordable nonvolatile memory such as an EEPROM (registered trademark) or a high-speed and readable-writable random-access memory such as a DRAM or an SRAM.

The information storage unit 11 stores machine information including at least one type of information out of maintenance history information, abnormality history information, and predicted lifespan information for each of a plurality of machines 2 in association with identification information of the machine 2 and makes a database of the information.

Identification information is an identification ID assigned to each machine 2 for managing the machine 2, and expressions such as a character string, a barcode, and a two-dimensional code are used. Note that while reference signs of identification information are denoted by 22-1, 22-2, . . . , and 22-*n* (where n is as natural number) in FIG. 1, the reference sign may be collectively denoted by 22 in another drawing.

Machine information is information associated with each machine 2 and is stored in the information storage unit 11 in association with identification information of the machine 2. While examples of machine information include maintenance history information, abnormality history information, predicted lifespan information, and operation plan information (a schedule indicating when the machine operates and when the machine stops) for each of the plurality of machines 2, another type of information may be included. Note that while reference signs of machine information are denoted by 21-1, 21-2, . . . , and 21-*n* (where n is as natural number) in FIG. 1, the reference sign may be collectively denoted by 21. A specific example of machine information and details of acquisition processing of machine information will be described later.

The information acquisition unit 18 acquires machine information and identification information related to the machine information. The machine information acquired by the information acquisition unit 18 is stored into the information storage unit 11 through the information update unit 14. The information acquisition unit 18 may acquire machine information from the machine 2 or from the input device 17 operated by an operator.

The information update unit 14 updates machine information previously stored in the information storage unit 11 to machine information acquired by the information acquisition unit 18 for a machine 2 for which an operation of maintenance or inspection is completed out of a plurality of machines 2, a machine 2 in which an abnormality has occurred out of the plurality of machines 2, and a machine 2 a predicted lifespan of which is updated with respect to the plurality of machines 2.

For example, when an operator completes a maintenance operation on a part in a machine 2, the operator inputs, through the input device 17, identification information of the machine 2 for which the maintenance operation is completed and machine information (maintenance history information) about the operation content and the operation date. The information acquisition unit 18 acquires the identification information and the machine information (maintenance history information) from the input device 17, and the information update unit 14 updates machine information (maintenance history information) related to the identification information previously stored in the information storage unit 11 to the machine information (maintenance history information) acquired by the information acquisition unit 18. Thus, the latest machine information (maintenance history information) of the machine 2 for which the operation is completed, the machine information being acquired by the information acquisition unit 18, is stored in the information storage unit 11 in association with the identification information. As described above, a burden of the update operation on machine information (maintenance history information) by an operator is light.

For example, when an abnormality occurs in a machine 2 and an alarm is output from the machine 2, the information acquisition unit 18 acquires identification information and machine information (abnormality history information) from the machine 2 in which the abnormality has occurred, and the information update unit 14 updates machine information (abnormality history information) being previously stored in the information storage unit 11 and being related to the identification information to the machine information (abnormality history information) acquired by the information acquisition unit 18. Thus, the latest machine information (abnormality history information) of the machine 2 in which the abnormality has occurred, the information being acquired by the information acquisition unit 18, is stored in the information storage unit 11 in association with the identification information. Accordingly, an update operation of machine information (abnormality history information) by an operator is not required, and a burden on the operator is lightened.

For example, when there is a machine 2 updated to a latest predicted lifespan by a predicted lifespan calculation unit (unillustrated) out of a plurality of machines 2, the information acquisition unit 18 acquires identification information and machine information (predicted lifespan information) from the machine 2 updated to the latest predicted lifespan, and the information update unit 14 updates machine information (predicted lifespan information) being previously stored in the information storage unit 11 and being related to the identification information to the machine information (predicted lifespan information) acquired by the information acquisition unit 18. Thus, the latest machine information (predicted lifespan information) about the machine 2, the information being acquired by the information acquisition unit 18, is stored in the information storage unit 11 in association with the identification information. Accordingly, an update operation of machine information (predicted lifespan information) by an operator is not required, and a burden on the operator is lightened.

The condition acceptance unit 12 accepts a search condition for specifying machine information desired by an operator. The search condition is input by the operator through the input device 17. Examples of the input device 17 include a keyboard, a mouse, a touch panel, and a voice recognition device that are attached to a computer or a mobile terminal. A touch panel has functions of both the display unit 15 and the input device 17.

A search condition specifies identification information of a machine 2 to be acquired by an operator by using the assistance device 1. For example, when an operator prefers to search for a machine 2 for which battery replacement is completed by a certain date, the operator sets information about "a date of battery replacement" or the like as a search condition. A "date" hereinafter may include concepts of "year, month, and day" and "time." Further, for example, when an operator prefers to search for a machine 2 in which an abnormality has occurred, the operator sets information about "a type of abnormality" or the like as a search condition. Further, for example, when an operator prefers to search for a machine 2 considered to reach the end of life within a certain period in the future, the operator sets information about "a predicted lifespan of a machine 2" or the like as a search condition. Specific examples of a search condition will be described later.

The information search unit 13 checks a search condition accepted by the condition acceptance unit 12 against machine information stored in the information storage unit 11 and extracts identification information of a machine 2 related to machine information satisfying the search condition. A plurality of pieces of identification information of a machine 2 may be extracted by the information search unit 13 depending on a setting content of a search condition. Specific examples of extraction of identification information of a machine 2 for a search condition will be described later. Identification information of a machine 2 extracted by the information search unit 13 is sent to the display unit 15 and the map generation unit 16.

The display unit 15 displays identification information extracted by the information search unit 13. Further, the display unit 15 displays a map generated by the map generation unit 16 to be described later. Examples of the display unit 15 include a display device attached to a mobile terminal, a display device attached to a computer, and a stand-alone display device.

The map generation unit 16 generates a map indicating the installation position of each of a plurality of machines 2. The map indicates a layout of machines 2 in a factory being a scope of application of the assistance device 1. The installation position of a machine 2 with identification information extracted by the information search unit 13 and the installation position of a machine with identification information not extracted by the information search unit 13 are discriminably indicated on the map. For example, an icon indicating the installation position of a machine 2 with identification information extracted by the information search unit 13 is displayed by red blinking, and an icon indicating the installation position of another type of machine 2 is displayed in black on the map. Further, identification information (such as a character string) of a machine 2 extracted by the information search unit 13, machine information of the machine 2, and the like may be indicated on the map along with an icon of the machine 2.

Further, it is preferable that the position of an operator using the assistance device 1 or the position of the assistance device 1 be discriminably indicated on the map. For example, when the assistance device 1 is configured with a computer installed in a fixed manner in a factory where machines 2 are installed or in the neighborhood thereof, the location where the computer is installed is indicated by an icon composed of a picture of a computer on the map.

Further, for example, when the assistance device 1 is configured with a mobile terminal, the current position of the assistance device 1 may be indicated by an icon composed of a picture of a mobile terminal on the map. Note that when the position of the assistance device 1 configured with a mobile terminal is to be reflected on the map, the map generation unit 16 generates a map on which the position of the mobile terminal measured by a position measurement unit 19 to be described later is superposed. Thus, an operator carrying the mobile terminal constituting the assistance device 1 can readily recognize a positional relation between the position of the operator and the installation position of a machine 2 with identification information extracted by the information search unit 13 (i.e., a machine 2 with machine information specified by the operator) by visually observing the map displayed on the display unit 15.

Note that the aforementioned technique for discriminably displaying elements on a map is strictly an example, and the elements may be discriminably displayed by another technique.

The position measurement unit 19 measures the position of the mobile terminal constituting assistance device 1 and sends the measurement result to the map generation unit 16. Thus, the map generation unit 16 can generate a map on which the position of the mobile terminal constituting the assistance device 1 is superposed. Note that when the assistance device 1 is configured with a computer installed in a fixed manner in a factory where machines 2 are installed, the position measurement unit 19 may be omitted.

The position measurement unit 19 may measure the position of a mobile terminal constituting the assistance device 1 by using a generally known positioning technique. Examples of such a technique include a technique of determining the position of a mobile terminal by determining signal strength (inversely proportional to the square of the distance) by using a Bluetooth (registered trademark) low energy (BLE) communication method and a technique of determining the position of a mobile terminal by using three-point positioning. Note that since GPS radio waves are blocked in a factory building, a plurality of beacon transmitters are installed in the factory building, and position measurement of a mobile terminal provided with a beacon receiver is performed. For example, in the technique of determining the position of the mobile terminal by using three-point positioning, the position of the beacon receiver provided in the mobile terminal can be measured based on the distance between each of three beacon transmitters out of a plurality of beacon transmitters the installation positions of which in the factory are obvious and the beacon receiver provided in the mobile terminal.

The above describes the configurations of the assistance device 1 according to the embodiment of the present disclosure and the machine system 1000 including the device.

Next, configurations of an assistance device 1 according to a modified example of the embodiment of the present disclosure and a machine system 2000 including the device will be described.

Figure 2:
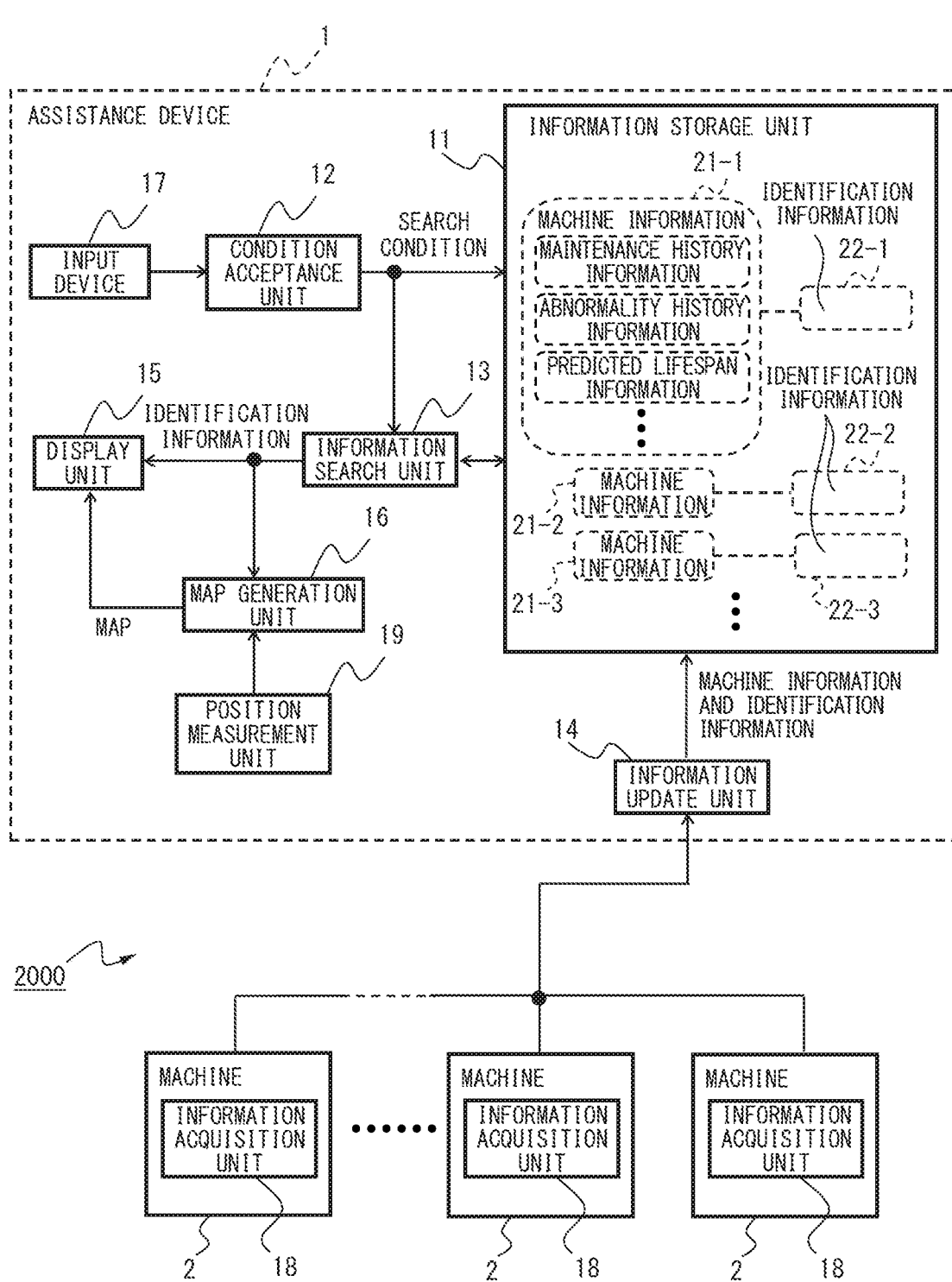
FIG. 2 is a block diagram of an assistance device and a machine system, according to a modified example of the embodiment of the present disclosure.

FIG. 2 is a block diagram of an assistance device and a machine system, according to a modified example of the embodiment of the present disclosure.

The assistance device 1 according to the modified example of the embodiment of the present disclosure and the machine system 2000 including the device differ from the assistance device 1 according to the embodiment of the present disclosure and the machine system 1000 including the device that are illustrated in FIG. 1 in that an information acquisition unit 18 is provided in each of a plurality of machines 2. The information acquisition unit 18 acquires machine information of a machine 2 in which the unit is provided and identification information of the machine 2 and sends the acquired information to an information update unit 14. The information update unit 14 updates the received machine information, based on a content of the operation, and an information storage unit 11 stores the machine information updated by the information update unit 14 in association with the identification information of the machine 2. The configuration is similar to the configuration described with reference to FIG. 1 except that the information acquisition unit 18 is provided in a machine 2, and therefore description thereof is omitted.

While not being illustrated, the information acquisition unit 18 may be provided in both the assistance device 1 and each of a plurality of machines 2 as a further modified example of the embodiment of the present disclosure.

Next, operation of the assistance device 1 according to the embodiment of the present disclosure will be described.

Figures 3A, 3B:
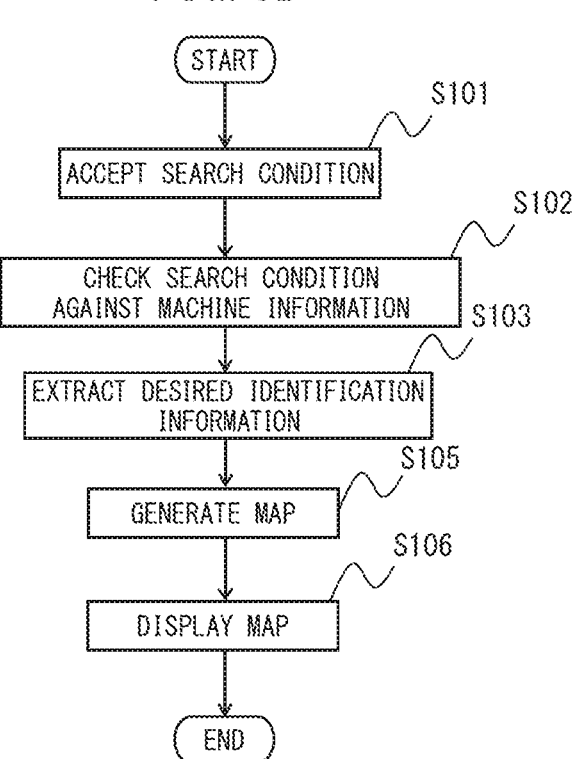
FIG. 3A is a flowchart illustrating a series of processing operations from acceptance of a search condition to display of a search result in the assistance device 1 according to the embodiment of the present disclosure and illustrates a case of displaying identification information as a search result.
FIG. 3B is a flowchart illustrating a series of processing operations from acceptance of a search condition to display of a search result in the assistance device 1 according to the embodiment of the present disclosure and illustrates a case of displaying a map as a search result.

FIG. 3A is a flowchart illustrating a series of processing operations from acceptance of a search condition to display of a search result in the assistance device 1 according to the embodiment of the present disclosure and illustrates a case of displaying identification information as a search result. FIG. 3B is a flowchart illustrating a series of processing operations from acceptance of a search condition to display of a search result in the assistance device 1 according to the embodiment of the present disclosure and illustrates a case of displaying a map as a search result.

When identification information is displayed as a search result, first, in step S101, the condition acceptance unit 12 accepts a search condition for specifying desired machine information, as described in FIG. 3A. The search condition is input by an operator through the input device 17. Next, in step S102, the information search unit 13 checks the search condition accepted by the condition acceptance unit 12 against machine information stored in the information storage unit 11 and, in step S103, extracts identification information of a machine 2 related to machine information satisfying the search condition. Then, in step S104, the display unit 15 displays the identification information extracted by the information search unit 13.

When a map is displayed as a search result, first, in step S101, the condition acceptance unit 12 accepts a search condition for specifying desired machine information, as described in FIG. 3B. The search condition is input by an operator through the input device 17. Next, in step S102, the information search unit 13 checks the search condition accepted by the condition acceptance unit 12 against machine information stored in the information storage unit 11 and, in step S103, extracts identification information of a machine 2 related to machine information satisfying the search condition. Next, in step S105, the map generation unit 16 generates a map on which the installation position of a machine 2 with identification information extracted by the information search unit 13 and the installation position of a machine with identification information not extracted by the information search unit 13 are discriminably displayed as a map indicating the installation position of each of a plurality of machines 2. When the assistance device 1 is configured with a mobile terminal in particular, the map generation unit 16 generates a map on which the current position of the assistance device 1 (i.e., the position of the operator carrying the assistance device 1) is superposed. Then, in step S106, the display unit 15 displays the map generated by the map generation unit 16.

FIG. 4 is a flowchart illustrating a series of processing operations from acquisition to storage of machine information in the assistance device 1 according to the embodiment of the present disclosure.

In step S201, the information acquisition unit 18 acquires machine information and identification information related to the machine information. The information acquisition unit 18 may acquire machine information from a machine 2 or may acquire the information from the input device 17 operated by an operator. For example, when an operation such as maintenance or inspection is completed on a machine 2, the operator inputs machine information about the machine 2 based on the operation content and identification information related to the machine information through the input device 17 along with information indicating operation completion; and in response, the information acquisition unit 18 acquires machine information about the machine 2 and identification information related to the machine information. Further, for example, the information acquisition unit 18 may periodically acquire machine information about each of a plurality of machines 2 and identification information related to the machine information.

Next, in step 202, the information update unit 14 updates the machine information acquired by the information acquisition unit 18, based on the content, and, in step S203, the information storage unit 11 stores the machine information updated by the information update unit 14 in association with the identification information of the machine 2.

Next, specific examples of machine information and acquisition processing of machine information will be described.

While examples of maintenance history information constituting machine information include a maintenance date of and information about the maintenance of various components provided in the machine 2, such as a battery, a motor, a gear, an arm, a fan, arrangement of cables, a tool, a jig, oil, and an electronic part, and an update date of and information about the update content of a computer program operating the machine 2, another type of information may be included. Note that while examples of a maintenance operation include a replacement operation, a repair operation, and a cleaning operation, another operation may be included.

For example, acquisition of maintenance history information by the information acquisition unit 18 is performed as follows. When a maintenance operation on machine 2 is completed, an operator inputs, through the input device 17, maintenance history information related to a content of the maintenance operation on the machine 2 and identification information related to the maintenance history information along with information indicating operation completion. In response to this, the information acquisition unit 18 acquires the maintenance history information about the machine 2 and the identification information related to the maintenance history information. Taking battery replacement in a machine 2 as an example, when battery replacement in a machine 2 is completed, an operator inputs, through the input device 17, information indicating battery replacement completion along with a "date of battery replacement" and identification information of the machine 2 undergoing the battery replacement that are maintenance history information. Receiving the information indicating battery replacement completion, the information acquisition unit 18 acquires information about the "date of battery replacement" and the identification information of the machine 2 undergoing the battery replacement that are maintenance history information about the machine 2.

Further, while examples of abnormality history information constituting machine information include the date of occurrence of an abnormality and the content thereof with respect to an abnormality related to operation itself of a machine 2, an abnormality in a workpiece caused as a result of operation of the machine 2, an abnormality in the machine system 1000 caused as a result of operation of the machine 2, and abnormalities in various components (such as a part and a software program) in the machine 2, another type of information may be included.

Acquisition of abnormality history information by the information acquisition unit 18 may be performed when an alarm is output from a machine 2. The information acquisition unit 18 periodically monitors whether an alarm is output from a machine 2. Examples of an output alarm include the following.

Examples of alarms related to a voltage drop of a battery provided in a robot or a machine tool, and an abnormality in a fan motor include the following.

For example, a backup battery for an encoder in a motor in a machine 2 is built into the machine 2 and is required to be replaced once every predetermined period (such as about one year). An alarm (warning) is output due to a voltage drop of the backup battery. When a voltage drop alarm for a backup battery is output from a machine 2, the information acquisition unit 18 acquires identification information of the machine 2 provided with the backup battery and, as abnormality history information, information about "occurrence of a voltage drop of a backup battery" and "the date of occurrence thereof."

For example, a battery for data backup is built into a controller of a machine 2 and is required to be replaced once every predetermined period (such as several years). An alarm (warning) is output due to a voltage drop of the battery for data backup. When a voltage drop alarm for a battery for data backup is output from a machine 2, the information acquisition unit 18 acquires identification information of the machine 2 for which the battery for data backup is provided in the controller and, as abnormality history information, information about "occurrence of a voltage drop of a battery for data backup" and "the date of occurrence thereof."

For example, a fan motor may be provided in a machine 2. Rotation of a fan motor starts upon power-up; and when a sticking state of oil mist adhering to the fan occurs at that time, a fan alarm is output from the machine 2. When the sticking state of oil mist is left alone, oil mist adhering to the fan accumulates, which may cause degradation in the cooling capacity due to a drop in the rotation speed of the fan. As a result, a motor and a servo amplifier in the machine 2 may overheat. When a fan alarm is output from a machine 2, the information acquisition unit 18 acquires identification information of the machine 2 provided with the fan motor and, as abnormality history information, information about "oil mist being stuck to a fan" and "the date of occurrence thereof."

Further, when a so-called "temporary stop" occurs in a robot being a machine 2, an alarm is output. A "temporary stop" is a stop repeatedly occurring in a short period of time for some reason in a machine provided in a factory. While a temporary stop tends to be overlooked due to a short downtime per stop, repeated temporary stops may lead to degraded operation efficiency of a machine 2, and therefore a temporary stop is distinguished from a "long stop" being a long-term stop and being easy to find. In general, when a temporary stop occurs in a robot, operations of installing a video camera, capturing an image of a behavior (including a temporary stop) of the robot, and investigating the cause of the temporary stop is performed. Examples of an alarm output when a temporary stop occurs include the following.

For example, in a case of a robot being a machine 2 gripping a workpiece with a hand, when full closure of a grip jaw is detected by a controller in the machine 2, a misgrip alarm is output from the controller. A misgrip by a hand of a robot is a typical temporary stop in a robot, and the cause of the misgrip needs to be investigated. In a robot detecting the position of a workpiece with a camera, a lighting condition, missetting of focus of the camera, or a shake of the camera due to vibration from peripheral equipment may cause a misgrip of the hand, and therefore the cause often cannot be determined immediately. When a misgrip alarm is output from a machine 2, the information acquisition unit 18 acquires identification information of the machine 2 and, as abnormality history information, information about "occurrence of a misgrip of a hand of a robot" and "the date of occurrence thereof."

For example, in a case of a robot being a machine 2 gripping a workpiece with a hand, when the hand interferes with the workpiece, a collision detection alarm is output from a controller of the machine 2. Interference between a hand and a workpiece is also a typical temporary stop in a robot, and the cause of the interference needs to be investigated. When a collision detection alarm is output from a machine 2, the information acquisition unit 18 acquires identification information of the machine 2 and, as abnormality history information, information about "interference between a hand and a workpiece" and "the date of occurrence thereof."

For example, in a case of an image of a workpiece being captured by a camera in a robot being a machine 2 and the position of the workpiece being measured, when the workpiece cannot be correctly recognized due to a lighting condition (for example, the surroundings being too dark or halation occurring due to reflection on a metal target object), a detection failure alarm is output from a controller of the machine 2. When a detection failure alarm is output from a machine 2, the information acquisition unit 18 acquires identification information of the machine 2 and, as abnormality history information, information about "a workpiece not being correctly recognized" and "the date of occurrence thereof."

Further, examples of a digital-servo-related alarm of a robot or a machine tool include a servo alarm indicating that replacement of a servo motor is required, a servo alarm indicating that replacement of a servo amplifier is required, and a servo alarm output due to missetting of a servo parameter, miswiring of a servo motor, or the like. When a servo alarm is output from a machine 2, the information acquisition unit 18 acquires identification information of the machine 2 and, as abnormality history information, information about "a content indicated by the servo alarm" and "the output date of the servo alarm."

Further, a machine 2 is often provided with an abnormality detection unit (unillustrated) monitoring data such as voltage, current, and rotation speed of a motor during normal operation of the machine 2 and outputting an abnormality occurrence alarm when a significant change occurs in the data. When an abnormality occurrence alarm is output from the abnormality detection unit in a machine 2, the information acquisition unit 18 acquires identification information of the machine 2 and, as abnormality history information, information about "an abnormal value of data such as voltage, current, and rotation speed of a motor" and "the date of occurrence thereof."

Further, while examples of predicted lifespan information constituting machine information include predicted lifespan information of various components in a machine 2, predicted lifespan information of the machine 2 itself, and predicted lifespan information of the machine system 1000 including the machine 2, another type of predicted lifespan information may be included. Predicted lifespan information can be calculated by a generally known method and for example, may be calculated based on durable years and the installation date of various components in the machine 2, the machine 2 itself, or the machine system 1000, and the current date and time; and machine learning may be used in the calculation.

Further, operation plan information of each of a plurality of machines 2 is preferably included in machine information. Operation plan information refers to a schedule indicating when the machine 2 operates and stops. With regard to a machine 2 in operation, it is rare to go so far as to stop operation of the machine 2 and perform a maintenance operation except for emergency. Therefore, when a search by the assistance device 1 is performed, search efficiency improves by removing a machine 2 currently in operation from a search target. Operation plan information for each machine 2 is stored in the information storage unit 11 as machine information, and "the machine being out of operation" is prepared to be set as a search condition. Thus, when an operator specifies "the machine being out of operation" as a search condition through the input device 17, a machine 2 in operation can be removed from an extraction target of identification information by the information search unit 13 upon acceptance of the search condition by the condition acceptance unit 12, and an operation burden on the operator can be further lightened.

Next, specific examples of extraction of identification information of a machine 2 with respect to a search condition and display of a search result will be described with reference to FIG. 5A to FIG. 9B. Note that search conditions, search results, and maps illustrated in FIG. 5A to FIG. 9B are strictly examples, and other search conditions, search results, and maps may be employed. Further, a search result based on a character string and a search result based on map display may be appropriately combined and be displayed on the display unit 15. Further, while each of the examples illustrated in FIG. 5A to FIG. 9B illustrates a screen on which a search condition is input with a character string, for example, various search conditions may be selectably displayed with a pull-down menu or icons.

FIG. 5A is a diagram illustrating a first example of a search condition and a search result displayed on the display unit in the assistance device according to the embodiment of the present disclosure and illustrates a search condition. FIG. 5B is a diagram illustrating the first example of a search condition and a search result displayed on the display unit in the assistance device according to the embodiment of the present disclosure and illustrates a search result. The first example including the search condition illustrated in FIG. 5A and the search result illustrated in FIG. 5B relates to searching for identification information of a machine 2 requiring battery replacement out of a plurality of machines 2. For example, an example of searching for a maximum of five machines last battery replacement times of which are Feb. 28, 2016 or earlier with regard to "ROBOT-100" being a model currently out of operation out of the plurality of machines 2 is illustrated. As illustrated in FIG. 5A, referring to a display content 31 by the display unit 15, an operator inputs, through the input device 17, "operation status: production out of service," "model: ROBOT-100," "last battery replacement time: 2016/2/28 or earlier," and "maximum number of output items: 5" as a search condition. The condition acceptance unit 12 accepts the search condition, and the information search unit 13 checks the search condition against machine information stored in the information storage unit 11 and extracts identification information of a machine related to machine information satisfying the search condition. Then, the display unit 15 displays, as a search result 32, machine IDs and last battery replacement dates related thereto as identification information of machines 2 satisfying the search condition in, for example, chronological order of last battery replacement date, as illustrated in FIG. 5B. Note that, with regard to a machine not undergoing battery replacement at all, the introduction date of the machine may be recorded in the information storage unit 11 as a last battery replacement date.

FIG. 6A is a diagram illustrating a second example of a search condition and a search result displayed on the display unit in the assistance device according to the embodiment of the present disclosure and illustrates a search condition. FIG. 6B is a diagram illustrating the second example of a search condition and a search result displayed on the display unit in the assistance device according to the embodiment of the present disclosure and illustrates a search result. The second example including the search condition illustrated in FIG. 6A and the search result illustrated in FIG. 6B relates to searching for identification information of a machine 2 satisfying a desired predicted lifespan out of a plurality of machines 2. For example, an example of searching for a maximum of four machines with a predicted lifespan of a second shaft reduction gear being a part in a model "ROBOT-300" currently out of operation being Jun. 30, 2022 or earlier out of the plurality of machines 2 is illustrated. As illustrated in FIG. 6A, referring to a display content 31 by the display unit 15, an operator inputs, through the input device 17, "operation status: production out of service," "model: ROBOT-300," "predicted lifespan of second shaft reduction gear: 2022/6/30 or earlier," and "maximum number of output items: 4." The condition acceptance unit 12 accepts the search condition, and the information search unit 13 checks the search condition against machine information stored in the information storage unit 11 and extracts identification information of a machine related to machine information satisfying the search condition. Then, the display unit 15 displays, as a search result 32, machine IDs and predicted end-of-life dates related thereto as identification information of machines 2 satisfying the search condition in, for example, chronological order of predicted end-of-life arrival date (i.e., in ascending order of predicted lifespan), as illustrated in FIG. 6B.

Figures 7A, 7B:
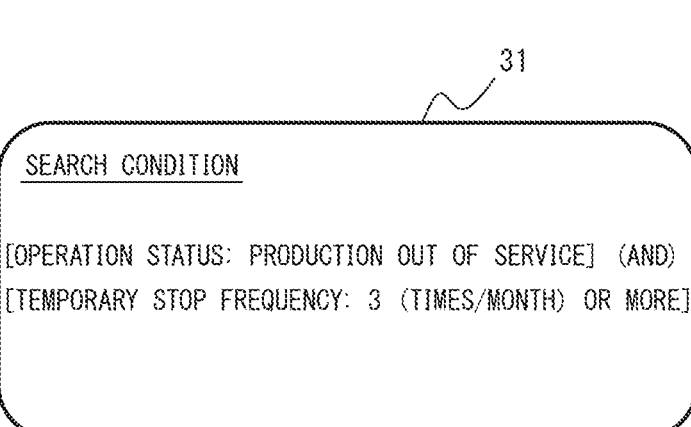
FIG. 7A is a diagram illustrating a third example of a search condition and a search result displayed on the display unit in the assistance device according to the embodiment of the present disclosure and illustrates a search condition.
FIG. 7B is a diagram illustrating the third example of a search condition and a search result displayed on the display unit in the assistance device according to the embodiment of the present disclosure and illustrates a search result based on character strings.

FIG. 7A is a diagram illustrating a third example of a search condition and a search result displayed on the display unit in the assistance device according to the embodiment of the present disclosure and illustrates a search condition. FIG. 7B is a diagram illustrating the third example of a search condition and a search result displayed on the display unit in the assistance device according to the embodiment of the present disclosure and illustrates a search result. The third example including the search condition illustrated in FIG. 7A and the search result illustrated in FIG. 7B relates to searching for identification information of a machine 2 in which a temporary stop has occurred with a predetermined frequency out of a plurality of machines 2. For example, an example of searching for a machine in which a temporary stop has occurred with a frequency of three times or more in the past month from machines 2 currently out of operation out of the plurality of machines 2 is illustrated. As illustrated in FIG. 7A, referring to a display content 31 by the display unit 15, an operator inputs, through the input device 17, "operation status: production out of service," and "temporary stop frequency: 3 (times per month) or more" as a search condition. The condition acceptance unit 12 accepts the search condition, and the information search unit 13 checks the search condition against machine information stored in the information storage unit 11 and extracts identification information of a machine related to machine information satisfying the search condition. Then, the display unit 15 displays, as a search result 32, machine IDs and temporary stop frequencies related thereto as identification information of machines 2 satisfying the search condition in, for example, descending order of frequency of a temporary stop, as illustrated in FIG. 7B.

Figure 8A:
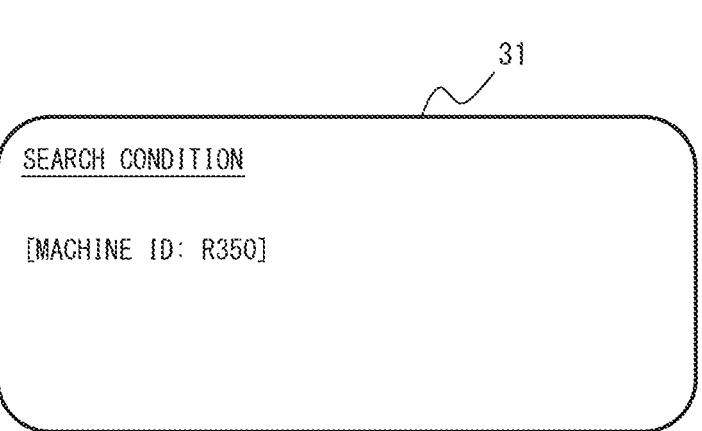
FIG. 8A is a diagram illustrating a fourth example of a search condition and a search result displayed on the display unit in the assistance device according to the embodiment of the present disclosure and illustrates a search condition.
Figure 8B:
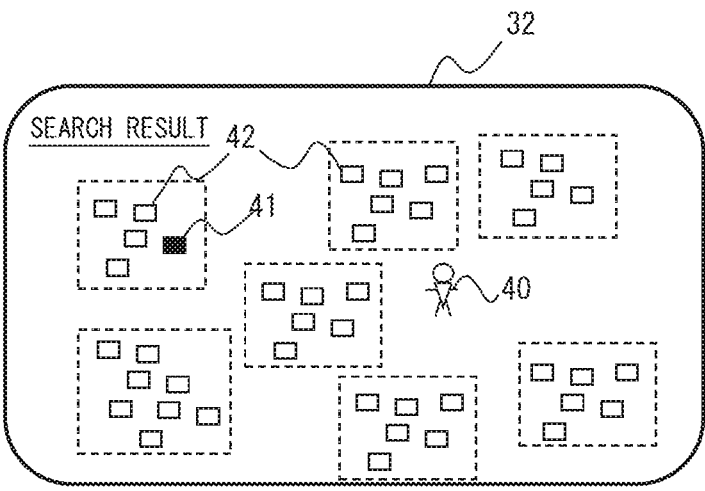
FIG. 8B is a diagram illustrating the fourth example of a search condition and a search result displayed on the display unit in the assistance device according to the embodiment of the present disclosure and illustrates a search result based on map display.

FIG. 8A is a diagram illustrating a fourth example of a search condition and a search result displayed on the display unit in the assistance device according to the embodiment of the present disclosure and illustrates a search condition. FIG. 8B is a diagram illustrating the fourth example of a search condition and a search result displayed on the display unit in the assistance device according to the embodiment of the present disclosure and illustrates a search result based on map display. The fourth example including the search condition illustrated in FIG. 8A and the search result illustrated in FIG. 8B relates to an operator carrying a mobile terminal constituting the assistance device 1 recognizing a machine 2 not working properly out of a plurality of machines 2 in advance and confirming the installation position of the machine 2 on the mobile terminal. For example, when a machine 2 with identification information "R350" is not working properly, referring to a display content 31 by the display unit 15, the operator inputs, through the input device 17, "machine ID: R350" as a search condition, as illustrated in FIG. 8A. The condition acceptance unit 12 accepts the search condition, and the map generation unit 16 generates a map. The display unit 15 displays, as a search result 32, a map on which a position 41 of the machine 2 with the "machine ID: R350" is indicated by, for example, a black box, positions 42 of the other machines 2 are indicated by, for example, white boxes, and a position 40 of the operator carrying the mobile terminal constituting the assistance device 1 is indicated by a human-shaped icon, as illustrated in FIG. 8B.

Figures 9A, 9B:
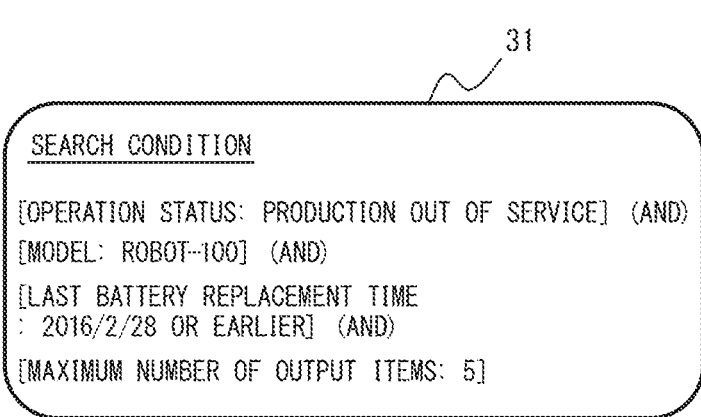
FIG. 9A is a diagram illustrating a fifth example of a search condition and a search result displayed on the display unit in the assistance device according to the embodiment of the present disclosure and illustrates a search condition.
FIG. 9B is a diagram illustrating the fifth example of a search condition and a search result displayed on the display unit in the assistance device according to the embodiment of the present disclosure and illustrates a search result based on map display.

FIG. 9A is a diagram illustrating a fifth example of a search condition and a search result displayed on the display unit in the assistance device according to the embodiment of the present disclosure and illustrates a search condition. FIG. 9B is a diagram illustrating the fifth example of a search condition and a search result displayed on the display unit in the assistance device according to the embodiment of the present disclosure and illustrates a search result based on map display. The fifth example including the search condition illustrated in FIG. 9A and the search result illustrated in FIG. 9B relates to causing the display unit 15 to display a map on which the position of a machine 2 requiring battery replacement out of a plurality of machines 2 is indicated. It is assumed in the example illustrated in FIG. 9A and FIG. 9B that the search condition is similar to that in the aforementioned first example. As illustrated in FIG. 9A, referring to a display content 31 by the display unit 15, an operator inputs, through the input device 17, "operation status: production out of service," "model: ROBOT-100," "last battery replacement time: 2016/2/28 or earlier," and "maximum number of output items: 5" as a search condition. The condition acceptance unit 12 accepts the search condition, and the information search unit 13 checks the search condition against machine information stored in the information storage unit 11 and extracts identification information of a machine related to machine information satisfying the search condition. Then, the map generation unit 16 generates a map on which the installation position of a machine 2 with identification information extracted by the information search unit 13 and the installation position of a machine with identification information not extracted by the information search unit 13 are discriminably indicated as a map indicating the installation position of each of the plurality of machines 2, as illustrated in FIG. 9B. The display unit 15 displays, as a search result 32, a map on which a position 41 of a machine 2 satisfying the search condition is indicated by, for example, a black box, positions 42 of the other machines 2 are indicated in, for example, white boxes, and a position 40 of an operator carrying a mobile terminal constituting the assistance device 1 is indicated by a human-shaped icon, as illustrated in FIG. 9B.

Next, a device configuration example of the assistance device 1 according to the embodiment of the present disclosure will be described. Note that while the assistance device 1 described with reference to FIG. 1 will be described as an example, the assistance device 1 described with reference to FIG. 2 is similarly applicable.

Figure 10:
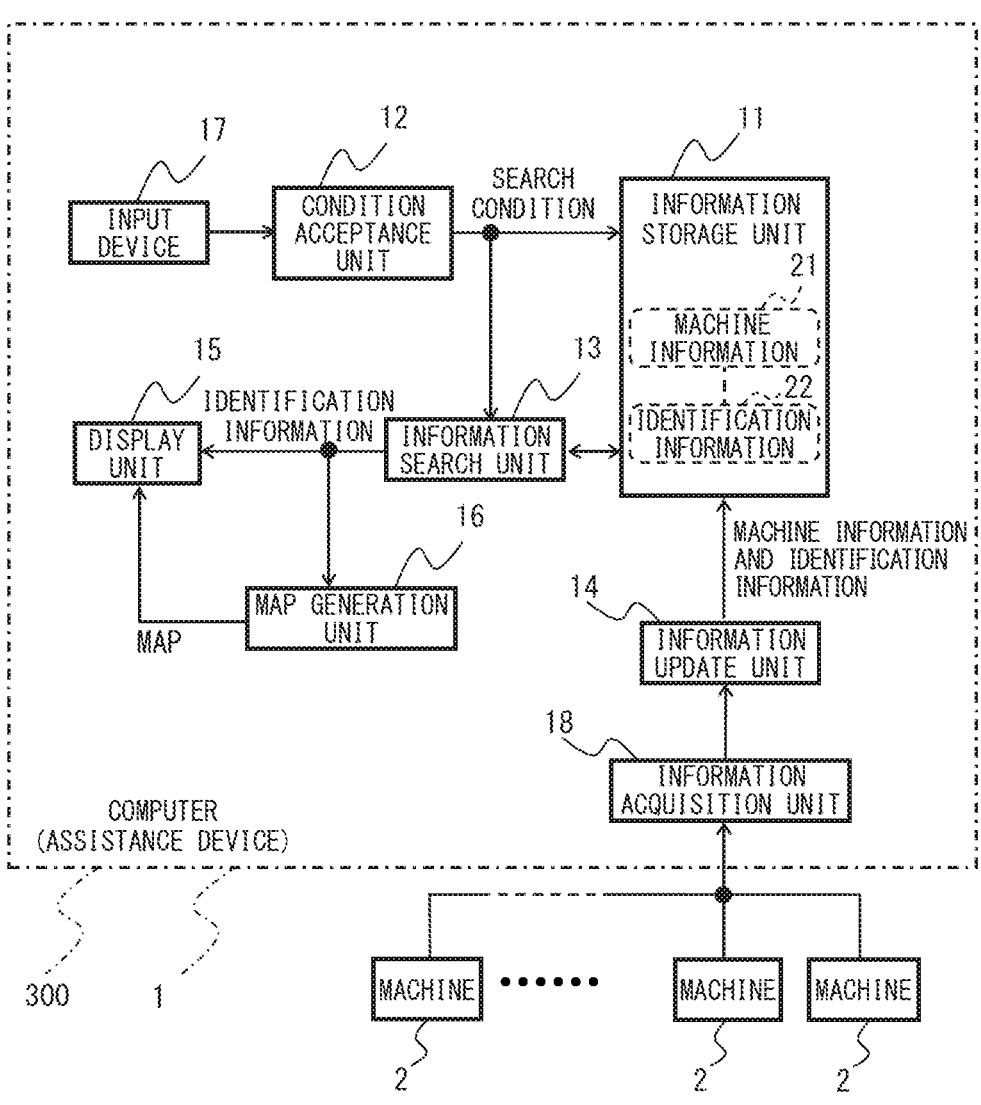
FIG. 10 is a block diagram illustrating a case of configuring the assistance device according to the embodiment of the present disclosure with a computer installed in a fixed manner.

FIG. 10 is a block diagram illustrating a case of configuring the assistance device according to the embodiment of the present disclosure with a computer installed in a fixed manner. For example, as illustrated in FIG. 10, the assistance device 1 is provided in a computer 300 installed in a fixed manner in a factory where machines 2 are installed or in the neighborhood thereof.

Figure 11:
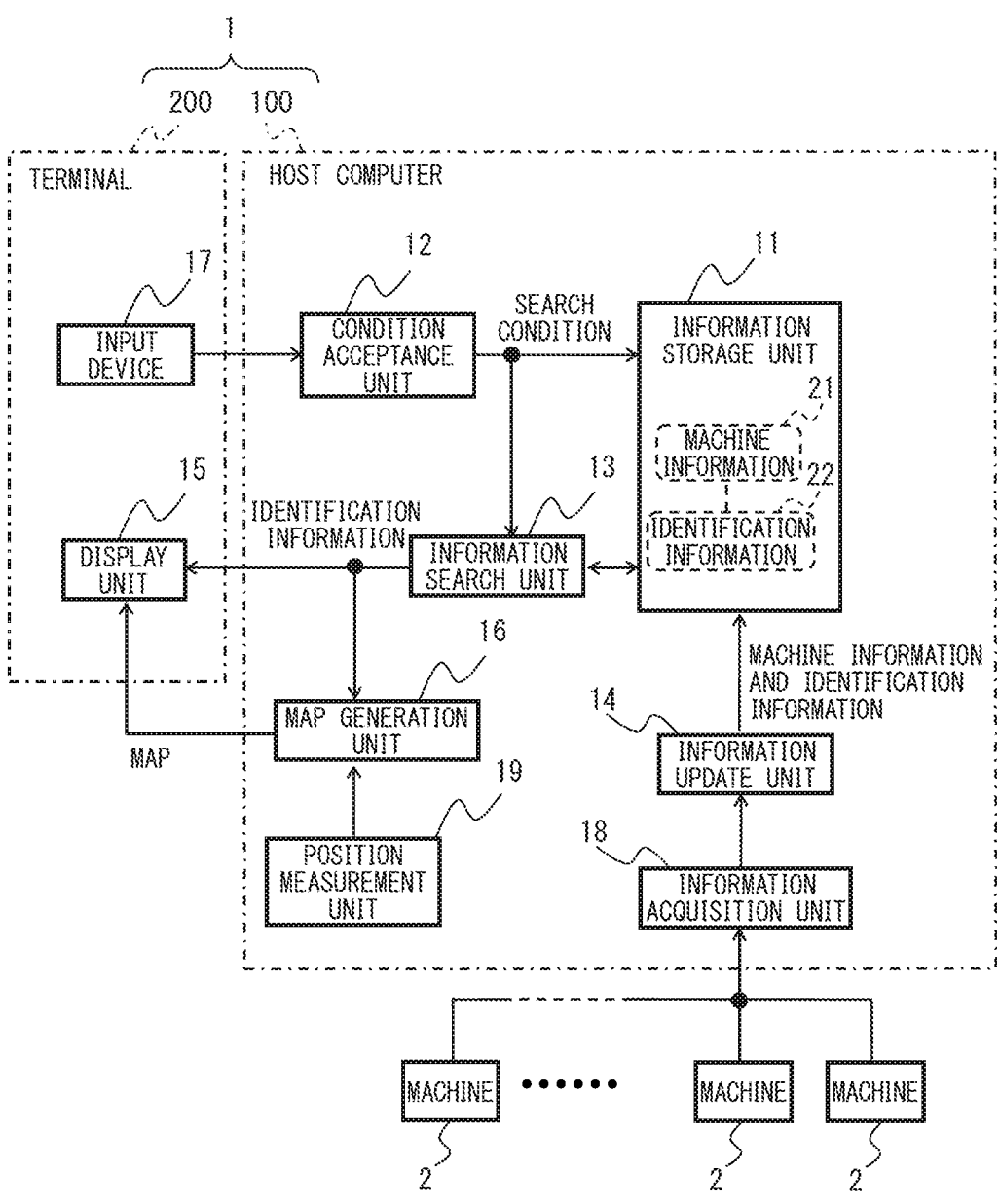
FIG. 11 is a block diagram illustrating a case of configuring the assistance device according to the embodiment of the present disclosure with a host computer and a mobile terminal.

FIG. 11 is a block diagram illustrating a case of configuring the assistance device according to the embodiment of the present disclosure with a host computer and a mobile terminal. For example, as illustrated in FIG. 11, the information storage unit 11, the condition acceptance unit 12, the information search unit 13, the information update unit 14, the map generation unit 16, the information acquisition unit 18, and the position measurement unit 19 in the assistance device 1 are provided in a host computer 100 installed in a fixed manner in a factory where machines 2 are installed or in the neighborhood thereof. Further, the display unit 15 and the input device 17 are provided in a mobile terminal 200. The host computer 100 is communicably connected to the mobile terminal 200. A search condition input through an input device on the mobile terminal 200 is transmitted from the mobile terminal 200 to the host computer 100 and is accepted by the condition acceptance unit. Identification information extracted by the information search unit 13 and a map generated by the map generation unit 16 are transmitted from the host computer 100 to the mobile terminal and are displayed by the display unit 15.

REFERENCE SIGNS LIST

1 Assistance device
2 Machine
11 Information storage unit
12 Condition acceptance unit
13 Information search unit
14 Information update unit
15 Display unit
16 Map generation unit
17 Input device
18 Information acquisition unit
100 Host computer
200 Mobile terminal

300 Computer
1000, 2000 Machine system

The invention claimed is:

1. An assistance device configured to assist an operation on a plurality of machines, the assistance device comprising:
   a processor with a memory configured to perform tasks;
   an information storage unit configured to store machine information including at least one type of information out of maintenance history information, abnormality history information, and predicted lifespan information for each of the plurality of machines in association with identification information of the machine;
   a condition acceptance unit configured to accept a search condition for specifying desired machine information;
   an information search unit configured to check the search condition accepted by the condition acceptance unit against the machine information stored in the information storage unit and extract identification information of a machine related to machine information satisfying the search condition;
   a display unit configured to display identification information extracted by the information search unit;
   a map generation unit configured to generate a map indicating an installation position of each of the plurality of machines and discriminably indicating an installation position of a machine with identification information extracted by the information search unit and an installation position of a machine with identification information not extracted by the information search unit, wherein the display unit displays the map generated by the map generation unit;
   a host computer provided with the information storage unit, the condition acceptance unit, the information search unit, and the map generation unit; and
   a mobile terminal being communicably connected to the host computer and being provided with the display unit and an input device for inputting the search condition, wherein:
   the search condition input through the input device is transmitted from the mobile terminal to the host computer and is accepted by the condition acceptance unit, and the map generated by the map generation unit is transmitted from the host computer to the mobile terminal and is displayed by the display unit.

2. The assistance device according to claim 1, wherein
   the machine information stored in the information storage unit in association with the identification information further includes operation plan information for each of the plurality of machines, and
   the search condition includes information that the machine is out of operation when the search condition is accepted by the condition acceptance unit.

3. The assistance device according to claim 1, further comprising an information update unit configured to update the machine information about a machine for which an operation is completed out of the plurality of machines, based on a content of the operation, wherein
   the information storage unit stores the machine information updated by the information update unit in association with identification information of a machine for which the operation is completed.

4. The assistance device according to claim 1,
   wherein the identification information extracted by the information search unit is transmitted from the host computer to the mobile terminal and is displayed by the display unit.

5. The assistance device according to claim 1, further comprising a position measurement unit configured to measure a position of the mobile terminal, wherein
   the map generation unit generates the map on which a position of the mobile terminal measured by the position measurement unit is superposed.

6. A machine system comprising:
   a plurality of machines; and
   the assistance device according to claim 1, wherein
   the assistance device includes an information acquisition unit configured to acquire the machine information.

7. A machine system comprising:
   a plurality of machines; and
   the assistance device according to claim 1, wherein
   each of the plurality of machines includes an information acquisition unit configured to acquire the machine information.

* * * * *